United States Patent
Ireland et al.

(10) Patent No.: US 10,244,104 B1
(45) Date of Patent: Mar. 26, 2019

(54) SOUND-BASED CALL-QUALITY DETECTOR

(71) Applicant: Microsoft Technology Licensing, LLC, Redmond, WA (US)

(72) Inventors: Richard Clive Ireland, Oxfordshire (GB); Michael T. Gilbert, Thornton, CO (US); Bradford R. Clark, Redmond, WA (US); Thomas Donald Barclay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/008,969

(22) Filed: Jun. 14, 2018

(51) Int. Cl.
*H04M 1/24* (2006.01)
*H04M 3/08* (2006.01)
*H04M 3/22* (2006.01)
*G10L 15/22* (2006.01)
*G10L 15/26* (2006.01)
*G10L 25/60* (2013.01)

(52) U.S. Cl.
CPC .......... *H04M 3/2236* (2013.01); *G10L 15/22* (2013.01); *G10L 15/265* (2013.01); *G10L 25/60* (2013.01); *H04M 3/2263* (2013.01)

(58) Field of Classification Search
CPC ............ H04L 41/5003; H04L 41/5009; H04L 41/5087; H04L 41/00; H04L 41/5022; H04L 41/5068; H04M 3/2227; H04M 3/2236; H04M 3/56; G06Q 10/06375
USPC .......... 379/1.01, 9, 14.01, 10.01, 12, 15.01, 379/15.05, 22, 22.02, 22.03, 24, 26.01, 379/27.01, 27.02, 27.03, 27.08, 29.09, 379/29.1, 32.01, 32.04
See application file for complete search history.

(56) References Cited

U.S. PATENT DOCUMENTS

| | | | | |
|---|---|---|---|---|
| 6,002,762 A | * | 12/1999 | Ramsden | H04M 3/18 379/24 |
| 6,304,634 B1 | * | 10/2001 | Hollier | H04M 3/2236 379/1.02 |
| 6,898,272 B2 | * | 5/2005 | Talalai | H04M 3/2236 375/224 |
| 6,970,554 B1 | * | 11/2005 | Peterson | H04M 3/42221 379/265.06 |
| 7,062,264 B2 | * | 6/2006 | Ko | H04L 41/00 379/29.09 |
| 8,194,565 B2 | * | 6/2012 | Goodman | H04L 41/5003 370/253 |
| 8,599,704 B2 | * | 12/2013 | Wang | H04M 3/002 370/251 |
| 9,135,928 B2 | * | 9/2015 | Dellisanti | G10L 25/60 |
| 9,232,049 B2 | * | 1/2016 | Assem | H04M 3/2227 |
| 9,286,786 B2 | * | 3/2016 | Pham | G08B 17/06 |
| 9,947,313 B2 | * | 4/2018 | Drewes | G10L 15/063 |

(Continued)

*Primary Examiner* — Binh Kien Tieu
(74) *Attorney, Agent, or Firm* — Schwegman Lundberg & Woessner, P.A.

(57) ABSTRACT

System and techniques for sound-based call-quality detector are described herein. An audio sample can be received via a hardware interface from an on-going communication. The audio sample can be processed to produce a transcript. The transcript can be compared to a call-quality dataset to produce a call-quality degradation indication. Here, the call quality dataset includes indicia of communication quality. Network maintenance can then be performed in response to the call-quality degradation indication. The network maintenance can include adjusting a network device setting.

18 Claims, 5 Drawing Sheets

(56) References Cited

U.S. PATENT DOCUMENTS

| | | | | |
|---|---|---|---|---|
| 2004/0022367 | A1* | 2/2004 | Talalai | H04M 3/2236 |
| | | | | 379/10.01 |
| 2005/0261895 | A1* | 11/2005 | Bauer | G10L 25/69 |
| | | | | 704/216 |
| 2007/0254644 | A1* | 11/2007 | Dobson | H04L 41/00 |
| | | | | 455/423 |
| 2007/0291907 | A1* | 12/2007 | Corcoran | H04M 1/24 |
| | | | | 379/1.01 |
| 2009/0129282 | A1* | 5/2009 | Lee | H04L 41/5009 |
| | | | | 370/252 |
| 2011/0040554 | A1* | 2/2011 | Audhkhasi | G09B 19/04 |
| | | | | 704/9 |
| 2016/0316059 | A1* | 10/2016 | Nuta | H04M 3/5175 |
| 2017/0133007 | A1* | 5/2017 | Drewes | G10L 15/063 |

* cited by examiner

SOUND-BASED CALL-QUALITY DETECTOR

TECHNICAL FIELD

Embodiments described herein generally relate to communications systems and more specifically to a sound-based call-quality detector.

BACKGROUND

Modern communications are conducted over a myriad of physical and logical technologies. Physical technologies can include wired—e.g., Ethernet, fiber optics, etc.—and wireless—e.g., cellular standards such as those promulgated by the Third Generation Partnership Project (3GPP), wireless local or personal area networks such as those promulgated by the international the Institute of Electrical and Electronics Engineers (IEEE), such as IEEE 802.11 and IEEE 802.15.x standards—media. Logical technologies used can include a number of different protocols, such as the World Wide Web Consortium (W3C) Hypertext Transfer Protocol (HTTP), Transport Layer Security (TLS), Real-Time Transport Protocol (RTSP), among others. Together, these technologies support a variety of communication modalities, such as data transfers, messaging, video, and voice communications.

More and more communications are conducted, at least in part, over networks in which little control can be exercised. The Internet is an example of a network that carries communications in which the sender or receiver has little control over the hardware or software that interacts with the communications data. The use of uncontrolled, or heterogeneous networks can result in several situations in which communication quality is diminished. Examples can include unacceptable latencies, data corruption, and the like. When audio or visual communication (e.g., referred to as a call) is used, human reliance on time-based signals to understand the communication result in poor comprehension of the call (e.g., poor call-quality) in the face of several communications defects, such as increased latency, jitter, etc.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
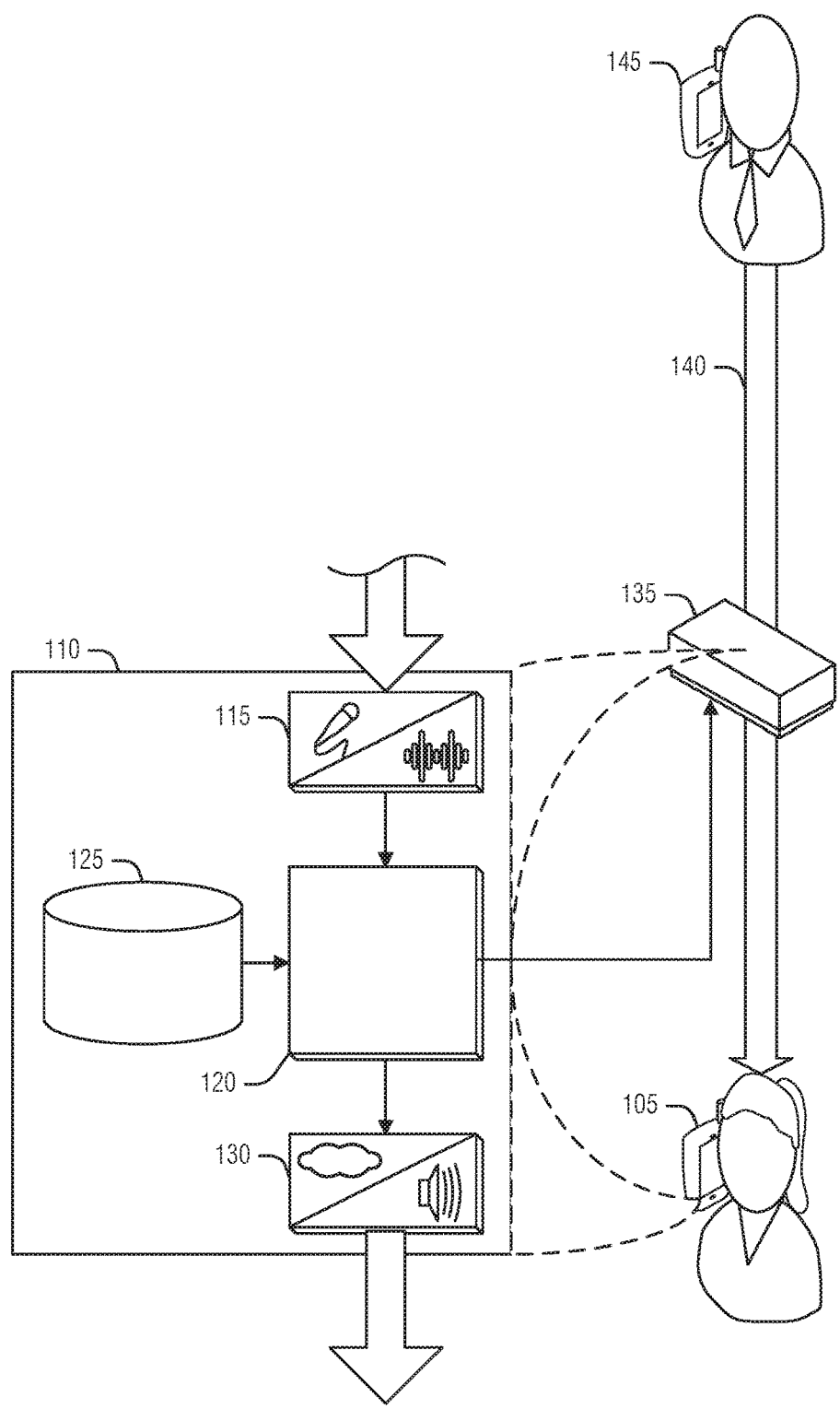
FIG. 1 is a block diagram of an example of an environment including a system for a sound-based call-quality detector, according to an embodiment.

Communications network techniques, such as measuring path bandwidth, latency, jitter, etc., and adjusting the communication accordingly have been tried to mitigate some call-quality issues. However, these network measures can be a poor proxy for the call-quality experienced by human participants. For example, although latency is high in a communication, the human participant does not notice in some examples, while a latency within limits can affect the human participant's understanding of the conversation. What is needed is a call-quality detector that measures participant experiences in order to detect poor communication quality, producing indications that can be acted upon to improve the communication.

An example of such a system employs voice recognition technology to sample participant experiences to produce a call-quality indication. In an example, a speaker independent verbal phrase detector can 'listening' for key words or phrases which identify poor call-quality. For example, if a participant states something like "can you hear me?" or "are you still there," an automatic speech recognition (ASR) system can intercept the phrase and act to provide a call-quality indication for the poor call. In an example, the ASR can produce a transcript of the voice communication and compare phrases from the transcript to a call-quality dataset that includes indicia, such as the phrases, of poor call-quality. This technique operates on the premise, when the voice path on person-to-person calls, or on person-to-conference bridge calls is poor or fails, the participant behavior predictably follows a pattern of assessing whether others can understand the participant or notifying the participant that communication has ended or is difficult. For example, once a person recognizes that they can't hear another person on a call, or that they can't be heard, there often follows a period of person to person verbal reestablishment. If this reestablishment fails, then one or more people generally hang-up, and may reconnect. Generally, the verbal reestablishment manifests as a largely fixed set—although defined per locale—of phrases, such as "hello . . . hello," or "I can't hear you," or the like. By observing the participant responses, and comparing them to the call-quality dataset, the system effectively gauges the call-quality as experienced by the participants, an advance of network-measurement proxies (such as jitter) previously employed.

In an example, the ASR could provide a confidence value from the transcript. Here, the indication can be based off the confidence value falling below a threshold. In this case, the ASR is attempting to understand the conversation, to produce the transcript, and the reduced confidence level suggests that the ASR is having difficulty doing so. Again, the participant experience is leveraged to determine the call quality.

Not only do these techniques provide an effective diagnostic tool for communication networks, it often can be employed in a secure manner. Because the participant experience is being measured, the system is effectively deployed at participant endpoints, or along a voice path for the communication. When the system performs its phrase detection, or transcript confidence scoring, in-place, there is no need to store or transmit the audio or visual material, resulting in a private, and secure, process. The resulting call-quality indication can be used to adjust a network parameter, such as re-establish the communication, re-route a portion of the communication over a different network segment, modify network device buffers, etc. This enables improved communications for participants by measuring user experiences directly—rather than relying on proxy metrics—in an efficient and secure manner.

FIG. 1 is a block diagram of an example of an environment including a system for a sound-based call-quality detector, according to an embodiment. The environment includes a communication 140 between two participant terminals, the terminal 105 and the terminal 145. Although illustrated as mobile phones, the terminals 105 and 145 can be any device capable of sending and receiving audio, such as a laptop, desktop, telephone, etc. The environment also includes a network device 135, such as a switch, hub, router, gateway, or the like. Although only one network device 135 is illustrated, generally many network devices are employed in network paths over which the communication 140 is conducted.

The environment also includes an audio processing device 110. The audio processing device 110 can be implemented in the network device 135, or the terminal 105. The audio processing device includes an audio input stack 115, and an audio output stack 130. The audio input stack 115 can include a variety of components that depend from where the audio is being captured. For example, if the audio processing device 110 is located in the terminal 105, and the user of the terminal 105 is providing the relevant audio, then the audio input stack 115 can include a microphone, analog-to-digital converter, mixer, etc. In contrast, if the user of the terminal 145 is providing the relevant audio, then the audio input stack can include a receiver, a decoder, or other components to render the user's audio on the terminal 105.

The audio input stack 110 is arranged to receiver an audio sample from the communication 140. In an example, the communication 140 is an on-going communication. Here "on-going" refers to a live conversation between participants as opposed to a pre-recorded or broadcast distribution of audio or video. In an example, the audio sample includes surrounding data to distinguish between elements in the call-quality dataset and other elements to reduce false positive indications. This additional data can prevent false-positive results when, for example, call-quality indicia are also used as part of a conversation instead of as a verbal re-establishment of the communication by the participants.

The audio output stack 130 is also one or more components that depend upon the audio source. For example, when the user of the terminal 105 provides the relevant audio, the audio output stack 130 can include an encoder and a transmitter. In contrast, if the user of the terminal 145 provides the audio, then the audio output stack 130 can include a digital-to-analog converter and a speaker on the terminal 105.

The audio processing device 110 includes, or is coupled to when in operation, processing circuitry 120, The processing circuitry 120 is arranged to process the audio sample to produce a transcript. As used herein, transcript refers to a representation of the audio in the sample that is in a different form than the audio itself. Thus, a transcript is not a simply a different encoding of audio, but a different kind of representation. Example forms of the transcript can include text, pictographs, images, graphs, statistics, data structures, phenomes, n-grams, neural network connections, etc. In an example, the transcript includes identification of a sound pattern that is not based on words. In an example, the sound pattern is a cut-out sound pattern that includes at least one transition from sound to no-sound within a pre-defined time period. This example captures certain tell-tale signs that a call has been interrupted, such as popping, a sudden lack of sound (e.g., the cut-out sound pattern etc.

In an example, the processing circuitry 120 is disposed between the audio input stack 115 and the audio output stack 130. Here, disposed between means that the processing circuitry has access, such as a tap, to a connection between the audio input stack 115 and the audio output stack 130. Thus, logically, the processing circuitry is between these two stacks, if not physically. In an example, the processing circuitry 120 is disposed between a microphone and a transmitter of the terminal 105. This is an example where the relevant audio sample is provided by the user of the terminal 105.

The processing circuitry 120 is arranged to compare the transcript to a call-quality dataset 125 to produce a call-quality degradation indication. The call-quality dataset 125 includes indici a of communication quality. Examples of these indicia are described below in various embodiments, but they generally are measurable quantities that correspond to call-quality. Thus, in an example, comparing the transcript to the call-quality dataset includes comparing phrases from the transcript with phrases in the call-quality dataset 125. The call-quality degradation indication can then be produced in response to matching a phrase from the transcript to a phrase in the library. These examples can operate as follows: during the communication 140, the call quality degrades until the user of the terminal 105 can no longer understand what the user of terminal 145 is saying. The user of terminal 105 then states, "Mike, I can't hear you Mike, can you please repeat yourself." The statement, in audio form is sampled by the audio input stack 115 and then passed to the processing circuitry 120. The processing circuitry 120 can implement ASR to convert the audio into a written transcript of the statement. The words from this transcript are then used to search the call-quality dataset 125. One or more indicia in the call-quality dataset corresponds to the uttered phrase, or a portion of the uttered phrase, and so a match is made. The processing circuitry 120 then produces the call-quality degradation indication. In an example, the transcript is supplemented by user-interface interactions of a user. In an example, the user-interface interactions include typing into a chat interface corresponding to the on-going communication. In an example, text resulting from the typing is added to the transcript. These examples further incorporate express user experiences to determine poor call quality. Thus, a participant typing "we can't hear you" can be treated in the same manner as the sound-based analysis in order to determine a reduction in call-quality.

In an example, the processing circuitry 120 implements an inference engine. Inference engines include a variety of computer machine learning techniques, such as expert systems, statistical models, and artificial neural networks, among others. Generally, inference engines can be trained to produce a range of results given certain stimuli. Thus, an artificial neural network can be trained to recognize the word "cool" by being given many samples of people speaking the word among other words, and a training process used to converge the network to indicate "cool" whenever the word is spoke and refrain otherwise. Expert systems generally involve normalized examples of data that are strung together by an expert in order to create inferences between the different input data.

In an example, the transcript is represented within an artificial neural network. Here, the artificial neural network performs the comparison of the transcript to the call-quality dataset 125 to produce the call-quality degradation indication as output of the artificial neural network. That is, the call-quality dataset 125 is encoded into the artificial neural network, and the operation of the network accepts audio data, classifies patterns in the audio (e.g., the transcript) and compares these to the encoded call-quality dataset. Thus, all are contained in and performed by the artificial neural network.

In an example, the transcript includes a confidence value for words in the transcript. Calculating a confidence value is typical in ASR processes. Often, several possible interpretations of the audio data are possible, referred to as hypotheses. These hypotheses are often ranked based on the confidence of a translation from audio to text, in order to select the most-likely result. These confidence values can be leveraged for an alternate purpose, to measure changes call-quality, because the confidence levels should drop as the call-quality is reduced. Thus, in an example, comparing the transcript to the call-quality dataset 125 includes calculating a variance between the confidence values in the output and historical confidence values in the call-quality dataset 125. The call-quality degradation indication can then be produced in response to the variance surpassing a threshold. In an example, a simple thresholding between the raw confidence value and a configurable (e.g., pre-set) threshold can be used to produce the call-quality degradation indication. It is worth noting that the confidence value comparison can also be used to indicate whether call-quality is good (e.g., above operational minimums). This can be used to flag current network configuration parameters, which can then be used to possibly correct future errors to the network.

The processing circuitry 120 is arranged to initiate network maintenance in response to the call-quality degradation indication. The network maintenance can include a variety of actions, such as logging the poor call-quality, resetting the communication 140, changing buffer sizes, re-routing the communication 140, etc. In an example, the network maintenance includes adjusting a network device setting for the network device 135. Thus, the network device 135 can be reset, modify its network interface setting (e.g., packet size, time-to-live parameter), etc.

By using the actual audio data for the communication 140, the processing circuitry 120 detects call-quality, including call-quality degradation, in a manner similar to participants in the communication 140. Some of this is captured from express participant commentary on the call-quality, such as looking for spoken or written phrases indicating something is wrong with the communication 140. Some is captured by observing what the ASR can of the incoming audio, such as an inability to produce a written transcript, or tell-tale disconnection sounds. These capabilities, alone or together, provide an advance over communication network control than is currently possible.

Figure 2:
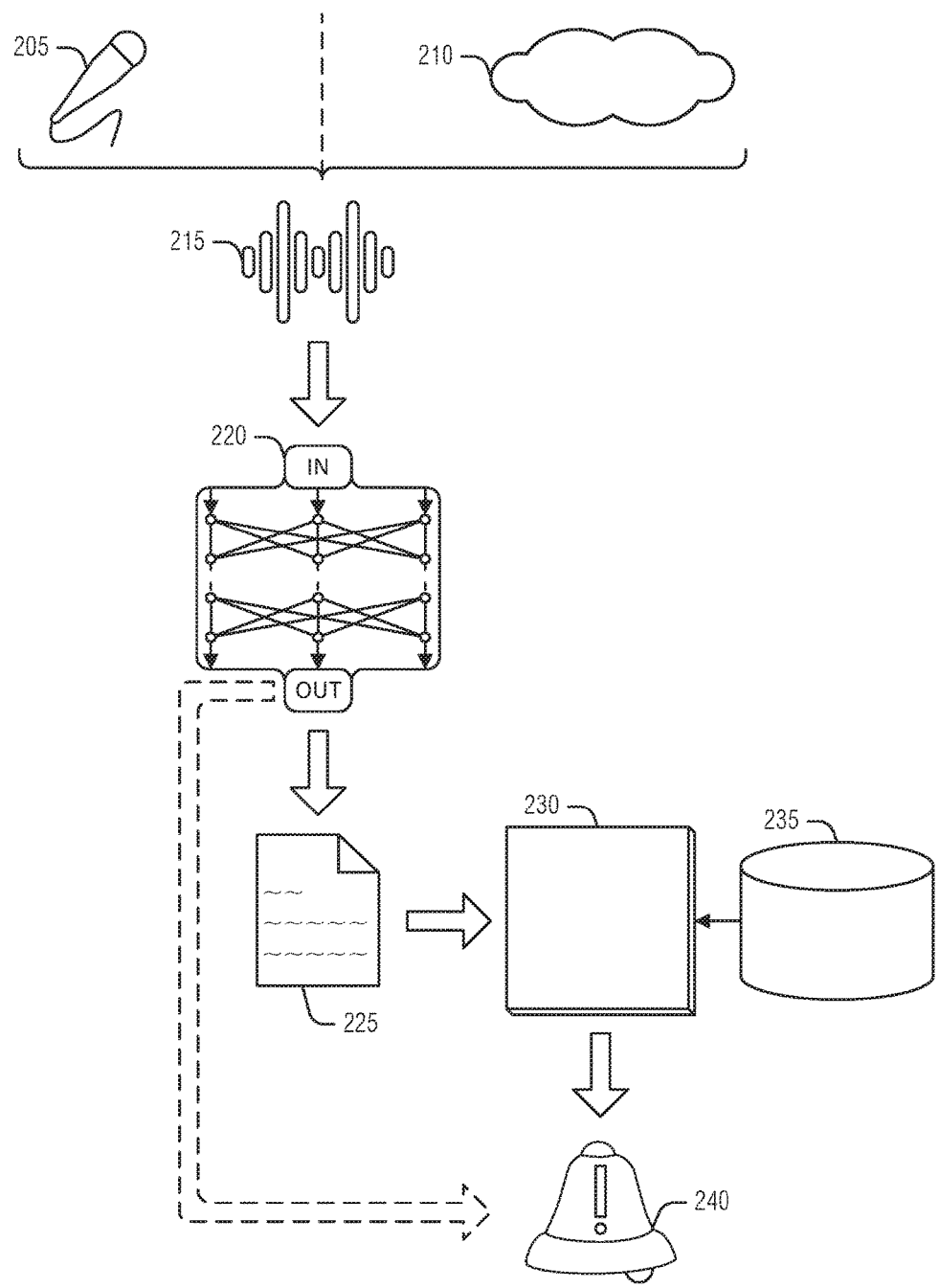
FIG. 2 illustrates an example of an inference engine to implement a sound-based call-quality detector, according to an embodiment.

FIG. 2 illustrates an example of an inference engine 220 to implement a sound-based call-quality detector, according to an embodiment. As noted above, the inference engine 220 can take a variety of forms, such as a statistical model, Markov chain, restricted Boltzmann machine, expert system, employ fuzzy logic, etc. The inference engine 220 can also be an artificial neural network, such as a feed-forward network, recurrent network, spiking neural network, convolutional neural network, deep learning network, etc.

Inference engines with learning processes are trained to correlate certain inputs with certain outputs. Here, the inference engine is created via the training, rather than by design, although design choices in the network, such as whether it is recurrent, a number of layers, etc. can affect how the network is trained, how quickly it operates, or how accurate it is.

To train the network, the training data provides a variety of examples from which inferences can be made. In a supervised training scenario, the inferences are known by the designers and used in the training. For example, the inference engine 220 can be exposed to people saying the word "no" in a variety of pitches, accents, speeds, etc. The inference that each person is saying "no" is used to correct outputs of the inference engine that do not reflect "no." Thus, the training is supervised. Unsupervised training does not use pre-known answers to the input data. Rather, the training technique converges on commonalities in the various pieces of the training data. Numerous unsupervised training techniques are known, such as spike-timing dependent plasticity used in spiking neural networks. Once the inference engine 220 converges on a pattern, observation is used to label and use the output for each recognized pattern.

As illustrated, audio samples 215 are obtained from a microphone 205, or network source 210, and provided to the inference engine 220. The inference engine is trained to classify waveform snippets from the audio sample 215 as match or no match. Thus, the inference engine 220 is a model that correlates waveform snippets into output that is either match, or no match. This output can be used to directly create the call-quality degradation indication 240.

In a supervised training technique, the model can be created by providing sample phrases of the call-quality dataset 235, and phrases that are not in the call-quality dataset 235. The model will start in an initial state, which for neural networks often involves a random assignment of weights between nodes. As phrases are provided to the model, it will produce an output. When the output is incorrect, the network is modified (e.g., via backpropagation) such that it will have a greater likelihood of being correct in the future.

Once the model is trained, it can be incorporated into the inference engine 220. In an example, several models can be incorporated into the inference engine. These finished models can then be used in a phrase detector that accepts the audio sample 215 as input. In an example, for each audio sample 215, the inference engine 220 can run a last n seconds through the trained model(s) where matches are identified and the last n seconds of the audio sample 215 are cached. In an example, n is the time of the longest trained phrase.

As noted above, the inference engine 220 can also be used to produce a written transcript 225 that can be compared to phrases in the call-quality dataset 235 by a comparator 230. In this example, the training produces textual output from the audio sample 215 rather than a simple match or no match indication. An advantage to this design permits leveraging of a variety of ASR systems in the inference engine 220 while using an easily updatable database of phrases in the call-quality dataset 235 without retraining the inference engine 220. Another advantage includes using confidence values for ASR transcription to infer the call-quality. Although more flexible and easily updatable, the match or no match inference engine 220 described above could be more compact, or run more easily on constrained hardware, such as can be found in many IP telephones.

Figure 3:
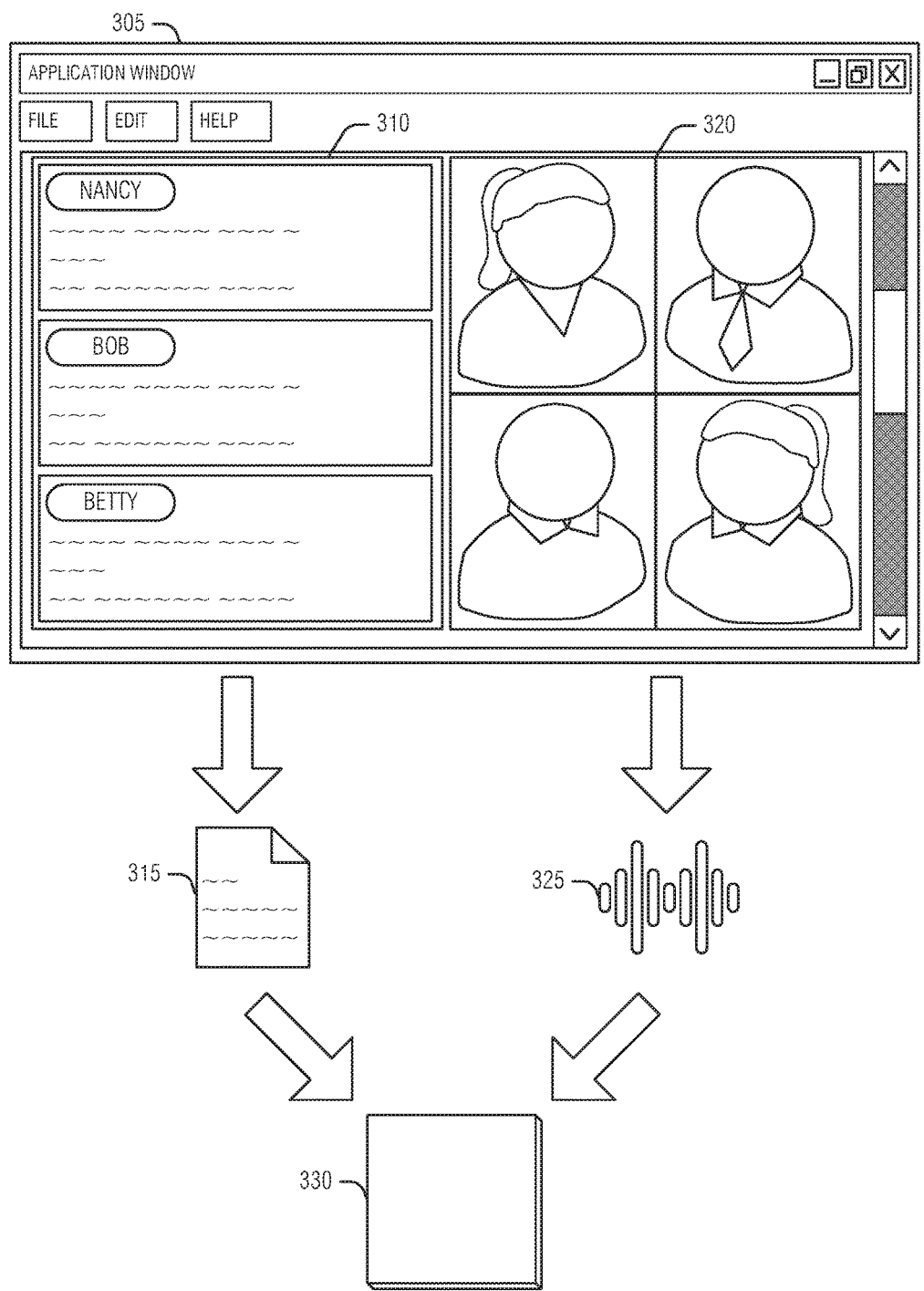
FIG. 3 illustrates an example of multi-channel inputs to augment a sound-based call-quality detector, according to an embodiment.

FIG. 3 illustrates an example of multi-channel inputs to augment a sound-based call-quality detector, according to an embodiment. As described above with respect to FIG. 1, textual input from participants 320 in a multichannel communication can be used to augment the sound-based call-quality detector 330. As illustrated, a communication user interface 305 can capture audio samples 325 from the participants 320. The user interface 305 can also include a chat window 310 or other input component into which the participants can type, for example. The input provided into the chat window 310 can be extracted into snippets 315 and also provided to the call-quality detector 330. Thus, an utterance of "I can't hear you" in the audio sample 325 can be combined with a typed phrase "Bob, you're cutting out"

captured in the snippet 315 by the call-quality detector 330 to produce the call-quality degradation indication used to correct the communications network.

Figure 4:
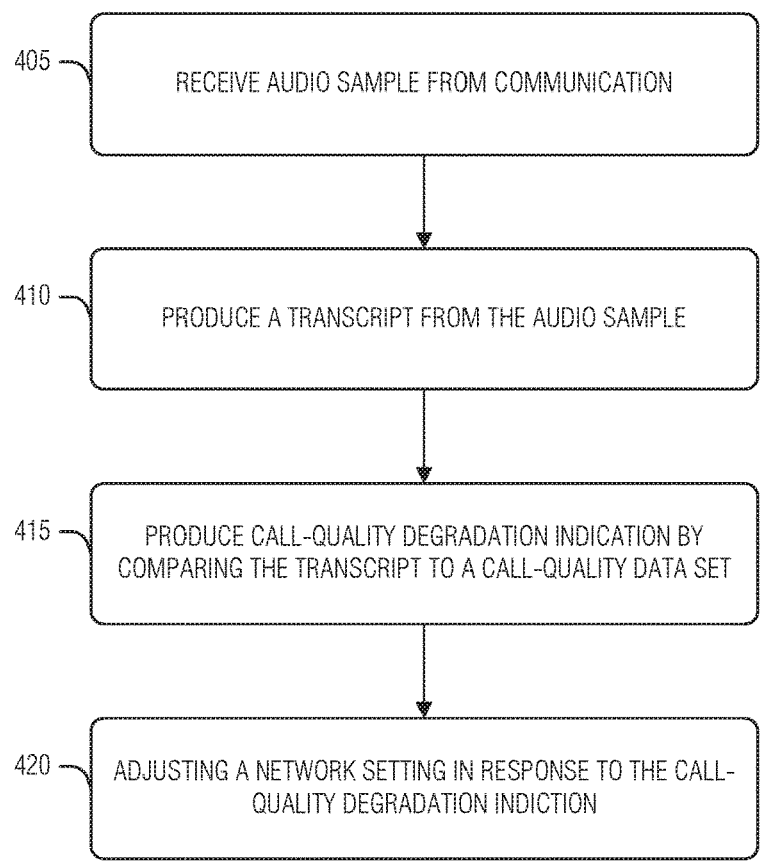
FIG. 4 illustrates a flow diagram of an example of a method for a sound-based call-quality detector, according to an embodiment.

FIG. 4 illustrates a flow diagram of an example of a method 400 for a sound-based call-quality detector, according to an embodiment. The operations of the method 400 are implemented in hardware, such as that described above or below (e.g., circuitry).

At operation 405, an audio sample is received from an on-going communication. The audio sample is received at a hardware interface, such as at an encoder, decoder, transmitter, receiver, mixer, digital-to-analog converter, analog-to-digital converter, or a tap between any of these, among others. Thus, in an example, the audio sample is received via a hardware interface disposed between a transmitter and a speaker of a device. In an example, the audio sample includes surrounding data to distinguish between elements in the call-quality dataset and other elements to reduce false positive indications.

At operation 410, the audio sample is processed to produce a transcript. In an example, the audio sample is processed by processing circuitry disposed between a microphone and a transmitter of a device. In an example, the processing circuitry implements an inference engine. In an example, the inference engine is an artificial neural network. In an example, the transcript includes identification of a sound pattern that is not based on words. In an example, the sound pattern is a cut-out sound pattern that includes at least one transition from sound to no-sound within a pre-defined time period.

At operation 415, the transcript is compared to a call-quality dataset to produce a call-quality degradation indication. In an example, the call quality dataset includes indicia of communication quality. In an example, comparing the transcript to the call-quality dataset includes comparing phrases from the transcript with phrases in the call-quality dataset. The call-quality degradation indication can then be produced in response to matching a phrase from the transcript to a phrase in the library. In an example, the transcript is supplemented by user-interface interactions of a user. In an example, the user-interface interactions include typing into a chat interface corresponding to the on-going communication. In an example, text resulting from the typing is added to the transcript.

In an example, the transcript is represented within an artificial neural network. Here, the artificial neural network performs the comparison of the transcript to the call-quality dataset to produce the call-quality degradation indication as output of the artificial neural network. That is, the call-quality dataset is encoded into the artificial neural network, and the operation of the network accepts audio data, classifies patterns in the audio (e.g., the transcript) and compares these to the encoded call-quality dataset. Thus, all are contained in and performed by the artificial neural network.

In an example, the transcript includes a confidence value for words in the transcript. In an example, comparing the transcript to the call-quality dataset includes calculating a variance between the confidence values in the output and historical confidence values in the call-quality dataset. The call-quality degradation indication can then be produced in response to the variance surpassing a threshold. In an example, a simple thresholding between the raw confidence value and a configurable (e.g., pre-set) threshold can be used to produce the call-quality degradation indication.

At operation 420, network maintenance is performed in response to the call-quality degradation indication. In an example, the network maintenance includes adjusting a network device setting.

Figure 5:
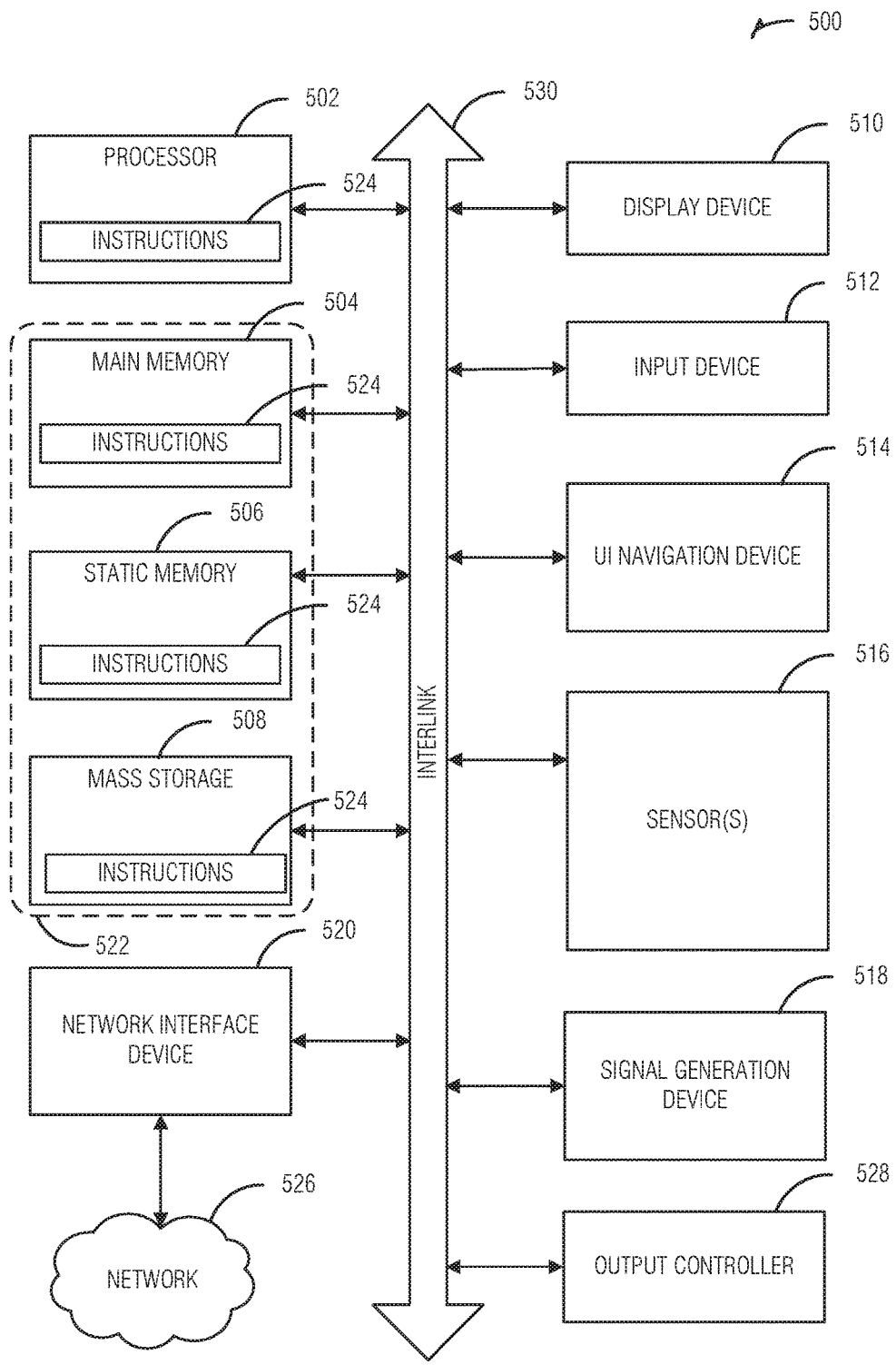
FIG. 5 is a block diagram illustrating an example of a machine upon which one or more embodiments can be implemented.

FIG. 5 illustrates a block diagram of an example machine 500 upon which any one or more of the techniques (e.g., methodologies) discussed herein can perform. Examples, as described herein, can include, or can operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc. Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 can operate as a standalone device or can be connected (e.g., networked) to other machines. In a networked deployment, the machine 500 can operate in the capacity of a server machine, a client machine, or both in server-client network environments. In an example, the machine 500 can act as a peer machine in peer-to-peer (P2P) (or other distributed) network environment. The machine 500 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 can include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which can communicate with each other via an interlink (e.g., bus) 530. The machine 500 can further include a display unit 510, an alphanumeric input device 512 (e.g., a keyboard), and a user interface (UI) navigation device 514 (e.g., a mouse). In an example, the display unit 510, input device 512 and UI navigation device 514 can be a touch screen display. The machine 500 can additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 can include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 can be, or include, a machine readable medium 522 on which is stored one or more sets of data structures or instructions 524 (e.g., software) embodying or utilized by any one or more of the techniques or functions described herein. The instructions 524 can also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 can constitute the machine readable media 522. While the machine readable medium 522 is illustrated as a single medium, the term "machine readable medium" can include a single medium or multiple media (e.g., a centralized or distributed database, and/or associated caches and servers) configured to store the one or more instructions 524.

The term "machine readable medium" can include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.), In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 can be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 can include one or more physical jacks (e.g., Ethernet, coaxial, or phone jacks) or one or more antennas to connect to the communications network 526. In an example, the network interface device 520 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a system for a sound-based call-quality detector, the system comprising: processing circuitry; and memory including instructions that, when executed by the processing circuitry, cause the processing circuitry to: receive, via a hardware interface, an audio sample from an on-going communication; process the audio sample produce a transcript; compare the transcript to a call-quality dataset to produce a call-quality degradation indication, the call quality dataset including indicia of communication quality; and preform network maintenance in response to the call-quality degradation indication, the network maintenance including adjusting a network device setting.

In Example 2, the subject matter of Example 1 includes, wherein the processing circuitry is disposed between a microphone and a transmitter of a device.

In Example 3, the subject matter of Example 2 includes, wherein the processing circuitry implements an inference engine.

In Example 4, the subject matter of Example 3 includes, wherein the inference engine is an artificial neural network.

In Example 5, the subject matter of Examples 1-4 includes, wherein the transcript is represented within an artificial neural network, wherein, to compare the transcript to the call-quality dataset, the processing circuitry uses the artificial neural network to produce the call-quality degradation indication as output of the artificial neural network.

In Example 6, the subject matter of Examples 1-5 includes, wherein the transcript includes a confidence value for words in the transcript.

In Example 7, the subject matter of Example 6 includes, wherein, to compare the transcript to the call-quality dataset, the processing circuitry is to: calculate a variance between the confidence values in the output and historical confidence values in the call-quality dataset; and produce the call-quality degradation indication in response to the variance surpassing a threshold.

In Example 8, the subject matter of Examples 1-7 includes, wherein, to compare the transcript to the call-quality dataset, the processing circuitry is to: compare phrases from the transcript with phrases in the call-quality dataset; and produce the call-quality degradation indication in response to matchinga phrase from the transcript to a phrase in the library.

In Example 9, the subject matter of Example 8 includes, wherein the transcript is supplemented by user-interface interactions of a user.

In Example 10, the subject matter of Example 9 includes, wherein the user-interface interactions include data typed into a chat interface corresponding to the on-going communication, and wherein text resulting from the typing is added to the transcript.

In Example 11, the subject matter of Examples 1-10 includes, wherein the transcript includes identification of a sound pattern that is not based on words.

In Example 12, the subject matter of Example 11 includes, wherein the sound pattern is a cut-out sound pattern that includes at least one transition from sound to no-sound within a pre-defined time period, In Example 13, the subject matter of Examples 11-12 includes, wherein the audio sample is received via a hardware interface disposed between a transmitter and a speaker of a device.

In Example 14, the subject matter of Examples 11-13 includes, wherein the audio sample includes surrounding data to distinguish between elements in the call-quality dataset and other elements to reduce false positive indications.

Example 15 is a method for a sound-based call-quality detector, the method comprising: receiving, via a hardware interface, an audio sample from an on-going communication; processing the audio sample produce a transcript; comparing the transcript to a call-quality dataset to produce a call-quality degradation indication, the call quality dataset including indicia of communication quality; and performing network maintenance in response to the call-quality degradation indication, the network maintenance including adjusting a network device setting.

In Example 16, the subject matter of Example 15 includes, wherein the audio sample is processed by processing circuitry disposed between a microphone and a transmitter of a device.

In Example 17, the subject matter of Example 16 includes, wherein the processing circuitry implements an inference engine.

In Example 18, the subject matter of Example 17 includes, wherein the inference engine is an artificial neural network.

In Example 19, the subject matter of Examples 15-18 includes, wherein the transcript is represented within an artificial neural network, wherein comparing the transcript to the call-quality dataset is performed by the artificial neural network to produce the call-quality degradation indication as output of the artificial neural network.

In Example 20, the subject matter of Examples 15-19 includes, wherein the transcript includes a confidence value for words in the transcript.

In Example 21, the subject matter of Example 20 includes, wherein comparing the transcript to the call-quality dataset includes: calculating a variance between the confidence values in the output and historical confidence values in the call-quality dataset; and producing the call-quality degradation indication in response to the variance surpassing a threshold.

In Example 22, the subject matter of Examples 15-21 includes, wherein comparing the transcript to the call-quality dataset includes: comparing phrases from the transcript with phrases in the call-quality dataset; and producing the call-quality degradation indication in response to matching a phrase from the transcript to a phrase in the library, In Example 23, the subject matter of Example 22 includes, wherein the transcript is supplemented by user-interface interactions of a user.

In Example 24, the subject matter of Example 23 includes, wherein the user-interface interactions include typing into a chat interface corresponding to the on-going communication, and wherein text resulting from the typing is added to the transcript.

In Example 25, the subject matter of Examples 15-24 includes, wherein the transcript includes identification of a sound pattern that is not based on words.

In Example 26, the subject matter of Example 25 includes, wherein the sound pattern is a cut-out sound pattern that includes at least one transition from sound to no-sound within a pre-defined time period.

In Example 27, the subject matter of Examples 25-26 includes, wherein the audio sample is received via a hardware interface disposed between a transmitter and a speaker of a device.

In Example 28, the subject matter of Examples 25-27 includes, wherein the audio sample includes surrounding data to distinguish between elements in the call-quality dataset and other elements to reduce false positive indications.

Example 29 is a device for a sound-based call-quality detector, the device comprising: means for receiving, via a hardware interface, an audio sample from an on-going communication; means for processing the audio sample produce a transcript; means for comparing the transcript to a call-quality dataset to produce a call-quality degradation indication, the call quality dataset including indicia of communication quality; and means for performing network maintenance in response to the call-quality degradation indication, the network maintenance including adjusting a network device setting.

In Example 30, the subject matter of Example 29 includes, wherein the means for processing the audio sample are disposed between a microphone and a transmitter of a device.

In Example 31, the subject matter of Example 30 includes, wherein the means for processing the audio sample implement an inference engine.

In Example 32, the subject matter of Example 31 includes, wherein the inference engine is an artificial neural network.

In Example 33, the subject matter of Examples 29-32 includes, wherein the transcript is represented within an artificial neural network, wherein the means for comparing the transcript to the call-quality dataset are performed by the artificial neural network to produce the call-quality degradation indication as output of the artificial neural network.

In Example 34, the subject matter of Examples 29-33 includes, wherein the transcript includes a confidence value for words in the transcript.

In Example 35, the subject matter of Example 34 includes, wherein the means for comparing the transcript to the call-quality dataset include: means for calculating a variance between the confidence values in the output and historical confidence values in the call-quality dataset; and means for producing the call-quality degradation indication in response to the variance surpassing a threshold.

In Example 36, the subject matter of Examples 29-35 includes, wherein the means for comparing the transcript to the call-quality dataset include: means for comparing phrases from the transcript with phrases in the call-quality dataset; and means for producing the call-quality degradation indication in response to matching a phrase from the transcript to a phrase in the library.

In Example 37, the subject matter of Example 36 includes, wherein the transcript is supplemented by user-interface interactions of a user.

In Example 38, the subject matter of Example 37 includes, wherein the user-interface interactions include typing into a chat interface corresponding to the on-going communication, and wherein text resulting from the typing is added to the transcript.

In Example 39, the subject matter of Examples 29-38 includes, wherein the transcript includes identification of a sound pattern that is not based on words.

In Example 40, the subject matter of Example 39 includes, wherein the sound pattern is a cut-out sound pattern that includes at least one transition from sound to no-sound within a pre-defined time period.

In Example 41, the subject matter of Examples 39-40 includes, wherein the audio sample is received via a hardware interface disposed between a transmitter and a speaker of a device.

In Example 42, the subject matter of Examples 39-41 includes, wherein the audio sample includes surrounding data to distinguish between elements in the call-quality dataset and other elements to reduce false positive indications.

Example 43 is a machine readable medium including instructions for a sound-based call-quality detector, the instructions, when executed by processing circuitry, cause the processing circuitry to perform operations comprising: receiving, via a hardware interface, an audio sample from an on-going communication; processing the audio sample produce a transcript; comparing the transcript to a call-quality dataset to produce a call-quality degradation indication, the call quality dataset including indicia of communication quality; and performing network maintenance in response to the call-quality degradation indication, the network maintenance including adjusting a network device setting.

In Example 44, the subject matter of Example 43 includes, wherein the audio sample is processed by processing circuitry disposed between a microphone and a transmitter of a device.

In Example 45, the subject matter of Example 44 includes, wherein the processing circuitry implements an inference engine.

In Example 46, the subject matter of Example 45 includes, wherein the inference engine is an artificial neural network.

In Example 47, the subject matter of Examples 43-46 includes, wherein the transcript is represented within an artificial neural network, wherein comparing the transcript to the call-quality dataset is performed by the artificial neural network to produce the call-quality degradation indication as output of the artificial neural network.

In Example 48, the subject matter of Examples 43-47 includes, wherein the transcript includes a confidence value for words in the transcript.

In Example 49, the subject matter of Example 48 includes, wherein comparing the transcript to the call-quality dataset includes: calculating a variance between the confidence values in the output and historical confidence values in the call-quality dataset; and producing the call-quality degradation indication in response to the variance surpassing a threshold.

In Example 50, the subject matter of Examples 43-49 includes, wherein comparing the transcript to the call-quality dataset includes: comparing phrases from the transcript with phrases in the call-quality dataset; and producing the call-quality degradation indication in response to matching a phrase from the transcript to a phrase in the library.

In Example 51, the subject matter of Example 50 includes, wherein the transcript is supplemented by user-interface interactions of a user.

In Example 52, the subject matter of Example 51 includes, wherein the user-interface interactions include typing into a chat interface corresponding to the on-going communication, and wherein text resulting from the typing is added to the transcript.

In Example 53, the subject matter of Examples 43-52 includes, wherein the transcript includes identification of a sound pattern that is not based on words.

In Example 54, the subject matter of Example 53 includes, wherein the sound pattern is a cut-out sound pattern that includes at least one transition from sound to no-sound within a pre-defined time period.

In Example 55, the subject matter of Examples 53-54 includes, wherein the audio sample is received via a hardware interface disposed between a transmitter and a speaker of a device.

In Example 56, the subject matter of Examples 53-55 includes, wherein the audio sample includes surrounding data to distinguish between elements in the call-quality dataset and other elements to reduce false positive indications.

Example 57 is at least one machine-readable medium including instructions that, when executed by processing circuitry, cause the processing circuitry to perform operations to implement of any of Examples 1-56.

Example 58 is an apparatus comprising means to implement of any of Examples 1-56.

Example 59 is a system to implement of any of Examples 1-56.

Example 60 is a method to implement of any of Examples 1-56.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system for a sound-based call-quality detector, the system comprising:
   processing circuitry; and
   memory including instructions that, when executed by the processing circuitry, cause the processing circuitry to:
   receive, via a hardware interface, an audio sample from an on-going communication;
   process the audio sample produce a transcript;
   compare the transcript to a call-quality dataset to produce a call-quality degradation indication, the call quality dataset including indicia of communication quality; and
   preform network maintenance in response to the call-quality degradation indication, the network maintenance including adjusting a network device setting.

2. The system of claim 1, wherein the transcript is represented within an artificial neural network, wherein, to compare the transcript to the call-quality dataset, the processing circuitry uses the artificial neural network to produce the call-quality degradation indication as output of the artificial neural network.

3. The system of claim 1, wherein the transcript includes a confidence value for words in the transcript.

4. The system of claim 3, wherein, to compare the transcript to the call-quality dataset, the processing circuitry is to:
   calculate a variance between the confidence values in the output and historical confidence values in the call-quality dataset; and
   produce the call-quality degradation indication in response to the variance surpassing a threshold.

5. The system of claim 1, wherein, to compare the transcript to the call-quality dataset, the processing circuitry is to:
   compare phrases from the transcript with phrases in the call-quality dataset; and
   produce the call-quality degradation indication in response to matching a phrase from the transcript to a phrase in the library.

6. The system of claim 5, wherein the transcript is supplemented by user-interface interactions of a user.

7. A method for a sound-based call-quality detector, the method comprising:
   receiving, via a hardware interface, an audio sample from an on-going communication;
   processing the audio sample produce a transcript;
   comparing the transcript to a call-quality dataset to produce a call-quality degradation indication, the call quality dataset including indicia of communication quality; and
   performing network maintenance in response to the call-quality degradation indication, the network maintenance including adjusting a network device setting.

8. The method of claim 7, wherein the transcript is represented within an artificial neural network, wherein comparing the transcript to the call-quality dataset is performed by the artificial neural network to produce the call-quality degradation indication as output of the artificial neural network.

9. The method of claim 7, wherein the transcript includes a confidence value for words in the transcript.

10. The method of claim 9, wherein comparing the transcript to the call-quality dataset includes:
    calculating a variance between the confidence values in the output and historical confidence values in the call-quality dataset; and
    producing the call-quality degradation indication in response to the variance surpassing a threshold.

11. The method of claim 7, wherein comparing the transcript to the call-quality dataset includes:
    comparing phrases from the transcript with phrases in the call-quality dataset; and
    producing the call-quality degradation indication in response to matching a phrase from the transcript to a phrase in the library.

12. The method of claim 11, wherein the transcript is supplemented by user-interface interactions of a user.

13. A device for a sound-based call-quality detector, the device comprising:
    means for receiving, via a hardware interface, an audio sample from an on-going communication;
    means for processing the audio sample produce a transcript;
    means for comparing the transcript to a call-quality dataset to produce a call-quality degradation indication, the call quality dataset including indicia of communication quality; and
    means for performing network maintenance in response to the call-quality degradation indication, the network maintenance including adjusting a network device setting.

14. The device of claim 13, wherein the transcript is represented within an artificial neural network, wherein the means for comparing the transcript to the call-quality dataset are performed by the artificial neural network to produce the call-quality degradation indication as output of the artificial neural network.

15. The device of claim 13, wherein the transcript includes a confidence value for words in the transcript.

16. The device of claim 15, wherein the means for comparing the transcript to the call-quality dataset include:

means for calculating a variance between the confidence values in the output and historical confidence values in the call-quality dataset; and means for producing the call-quality degradation indication in response to the variance surpassing a threshold.

17. The device of claim 13, wherein the means for comparing the transcript to the call-quality dataset include:

means for comparing phrases from the transcript with phrases in the call-quality dataset; and means for producing the call-quality degradation indication in response to matching a phrase from the transcript to a phrase in the library.

18. The device of claim 17, wherein the transcript is supplemented by user-interface interactions of a user.

* * * * *